US006877162B1

(12) United States Patent
Thompson

(10) Patent No.: US 6,877,162 B1
(45) Date of Patent: Apr. 5, 2005

(54) METHOD AND SYSTEM FOR EXTENDABLE CLASS-BASED SHARED DATA-TYPES

(75) Inventor: Jeffrey B. Thompson, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 892 days.

(21) Appl. No.: 09/628,919

(22) Filed: Jul. 31, 2000

(51) Int. Cl.$^7$ ............................................. G06F 9/44
(52) U.S. Cl. ................................................ 719/315
(58) Field of Search ............................... 719/315, 316, 719/332, 331; 707/103 R; 717/114, 116; 709/223, 203, 231

(56) References Cited

U.S. PATENT DOCUMENTS

| | | | | | |
|---|---|---|---|---|---|
| 5,327,559 | A | * | 7/1994 | Priven et al. | 718/101 |
| 5,583,983 | A | * | 12/1996 | Schmitter | 717/138 |
| 5,615,400 | A | * | 3/1997 | Cowsar et al. | 719/332 |
| 5,732,263 | A | * | 3/1998 | Havens et al. | 707/103 R |
| 5,754,849 | A | * | 5/1998 | Dyer et al. | 707/101 |
| 5,805,796 | A | * | 9/1998 | Finch et al. | 714/40 |
| 5,864,862 | A | * | 1/1999 | Kriens et al. | 707/103 R |
| 5,867,709 | A | * | 2/1999 | Klencke | 717/111 |
| 6,272,521 | B1 | * | 8/2001 | Jablonski et al. | 709/200 |
| 6,298,353 | B1 | * | 10/2001 | Apte | 707/103 R |
| 6,301,585 | B1 | * | 10/2001 | Milne | 707/103 R |
| 6,477,701 | B1 | * | 11/2002 | Heistermann et al. | 717/108 |
| 6,526,457 | B1 | * | 2/2003 | Birze | 719/328 |
| 6,766,324 | B2 | * | 7/2004 | Carlson et al. | 707/10 |

OTHER PUBLICATIONS

Java Object Serialization Specification, Sun Microsystems, Inc. Feb. 1997.*
R. Nakano, et al, "Runtime Support for Extended Types in C++", IEEE, 1995, pp. 351–359.*
T. Ohta, et al, "Software Portability in CTRON", IEEE, 1991, pp. 86–92.*
K. Saito, et al, "Applying Object Oriented Programming to Developing Programs on CTRON Interfaces", IEEE, 1991, pp. 103–117.*

* cited by examiner

*Primary Examiner*—Sue Lao

(57) ABSTRACT

A method is disclosed for creating and using an extendable class-based shared data-type in object oriented programming to overcome versioning problems between interconnected devices. An extensible object class is created by defining a data-type having a base class, a type identifier, and a space reserved for additional properties. The base classes are known by all devices in the original version. New classes are added by using an existing base class and adding additional attributes to the additional properties portion of the new data-type. The type identifier is a unique number or string that identifies the data-type and certain information regarding the base class. An older version of a device that receives a new data-type from a newer device can determine the base class properties of the new data-type by reference to a catalog. Based on this base class information, the older version of a client or server can process the new data-type. Even if the older version cannot accommodate the new attributes, recognition of the base classes ensures that the device will not halt the transfer of information and that it will process the data-type to the extent that it recognizes its properties.

14 Claims, 2 Drawing Sheets

METHOD AND SYSTEM FOR EXTENDABLE CLASS-BASED SHARED DATA-TYPES

FIELD OF INVENTION

The present invention relates generally to software systems. More particularly, it relates to a software method and system for handling versioning problems in object oriented programming.

BACKGROUND

In the field of computer networking, hardware in a system may be interconnected. For example, a server may be connected to client terminals, which may themselves be connected directly or through the server to peripheral devices. Communication between these interconnected hardware devices is controlled through software. With respect to the transmission of data from one client to another using object-oriented programming, the software objects may be serialized and transmitted through the server to the recipient client. In order for the server to process the transmitted data and in order for the recipient client to understand the data, the system must have a uniform definition of the object.

In interconnected systems, a versioning problem exists when the hardware or the software of one device is upgraded to a new version while other devices operate using an older version. In a system having multiple interconnected devices, it is possible for several different versions of the hardware and/or software to be running at the same time. In order for these devices to effectively communicate with each other, they must share some commonalities. For example, in a system using object oriented programming that defines certain classes, every device in the system must recognize the class; otherwise, the devices cannot properly communicate with each other. In a system that defines classes, both the sender and the recipient must understand the class and must have consistent definitions of those classes so that they may be properly interpreted. A versioning problem results when a newer version of a hardware or software device uses classes that are not defined in the earlier versions.

The problem with using different versions is that a user of an older version might not be able to recognize new classes that are defined in the newer version, because they were not defined in the original software. The problem may likewise affect the server that delivers the data from the sending client to the recipient client. If the server is of an older version and does not recognize the new classes of objects transmitted by the sending client, then the server may refuse to deliver the data to the recipient because it may lack the understanding of the data. The results of this versioning problem vary in existing systems. In some instances, the recipient client might receive the data, but will be unable to process it. In worse cases, existing clients, servers, or other devices in the system may entirely shut down if they do not recognize a new class definition of an object.

What is needed is a system for handling versioning problems that enables a user of an older version to receive new class definitions without completely shutting down. In particular, what is needed is a system that defines software objects such that new classes can be added by leveraging known definitions, such that an older version of a device will recognize and process some part of the new object classes without faulting.

SUMMARY

A method and software system are disclosed for creating and using an extendable class-based shared data-type in object oriented programming to overcome versioning problems between interconnected devices. An extensible object class is created by defining a data-type having a base class, a type identifier, and a space reserved for additional properties. The base classes are known by all devices in an original version. New classes are added by using an existing base class and adding additional attributes to the additional properties portion of the new data-type. The type identifier is a unique number or string that identifies the data-type and certain information regarding the base class. An older version of a device that receives a new data-type from a newer device can determine the base class properties of the new data-type by reference to a catalog. Based on this base class information, the older version of a client or server can process the new data-type. Even if the older version cannot accommodate the new attributes, recognition of the base classes ensures that the device will not halt the transfer of information and that it will process the data-type to the extent that it recognizes its properties.

DESCRIPTION

In object-oriented software, such as Java or C++, classes are used to define software objects. The class definitions include the data attributes of the class and also include methods of the object. An object is a particular item defined by the class. A particular object is represented as an instance of the class, having certain values. The system forms classes and structures by specifying base functionality at the programming level. This allows the addition of data elements to the base classes. A computer system implementing the data-type method allows different versions of a client and a server to share a common understanding of changing definitions, because the base class is known by both old and newer versions.

Figure 1:
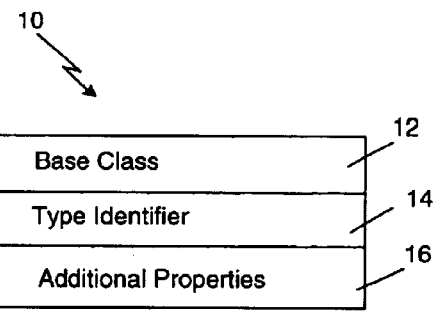
FIG. 1 shows a block diagram of the structure of a data-type of an object.

A computer system in which data-type object-oriented programming is used creates extendable class-based data-types, by defining software objects as data-types, where the data-type is a set of meta-information about a base class. FIG. 1 shows the format of a data-type 10 having a base class 12, a type identifier 14, and an additional properties portion 16. The base class 12 forms the common definitions of certain base objects that are used in the system. The base class 12 defines general properties of the objects that are used by the system 50, shown in FIG. 2. In one embodiment, all objects defined in an original data-type version and in later versions will use a common set of base classes 12.

The type identifier 14 provides a common means of identifying each data-type 10 so that the data-types 10 may be cataloged by a server or a client and cross-referenced. From the type identifier 14, the base class 12 or its properties can be determined. The devices, such as the client or the server, can maintain a catalog of the existing data-types organized by their type identifiers 14. Based on the type identifier 14, an older version of hardware used in the system can recognize common base characteristics of a newer data-type 10.

The additional properties portion 16 further defines the specific attributes of an object. Each additional property 16 is a name-value pair, where the name is an identifier (typically a string) and the value is an object of any class known to all clients and servers. The additional properties portion 16 also serves as a space reserved for adding modifications to the data-type 10. Each base class 12 may have a way to store, process, and set additional properties 16.

Servers 30 and clients 20 (shown in FIG. 2) may have a mechanism for sharing the data-type 10 information. The servers and clients may be able to create and accept new data-types 10. However, in one embodiment, early versions of the server and clients might not be required to allow users to create, manipulate, or use new data-types 10. In one embodiment, the system 50 may be able to handle new data-types 10 from later versions, for example by sharing only base-class 12 properties or by indicating an inability to handle the type 10.

To make new data-types 10 that can be recognized by earlier versions, data-types 10 are defined to include an additional properties portion 16 that is reserved for attributes that may define new data-types 10 added by future versions. A future client or server version may define new objects 10, or data-types 10, having new properties designed to perform a new function. A new data-type 10 builds on the base class 12 by reusing existing base classes 12 and adding additional properties thereto. The existing base class 12 forms a common threshold of knowledge between older and newer versions of the server and client because data-types 10 used by all versions of the server and client will have common base class 12 definitions. A new data-type 10 is created in newer versions by adding the new attributes to the additional properties portion 16 of the data-type 10. A new data-type 10 has a known base class 12, plus additional name-value pairs as additional properties 16.

By using a common base type 12, the system 50 avoids the problem of non-recognition of new data-types 10 by older versions of clients and servers by providing a common understanding between old and new data-types 10. When an older version of a client or server receives a newer data-type 10, the older server or client will, by definition, recognize the base class 12, even though the older version of the client or server does not recognize the new attributes contained in the additional properties portion 16 of the data-type 10. Because the older version of the client or server recognizes the base class 12, the client or server knows how to process the new data-type 10 and can perform limited functions on it.

Figure 2:
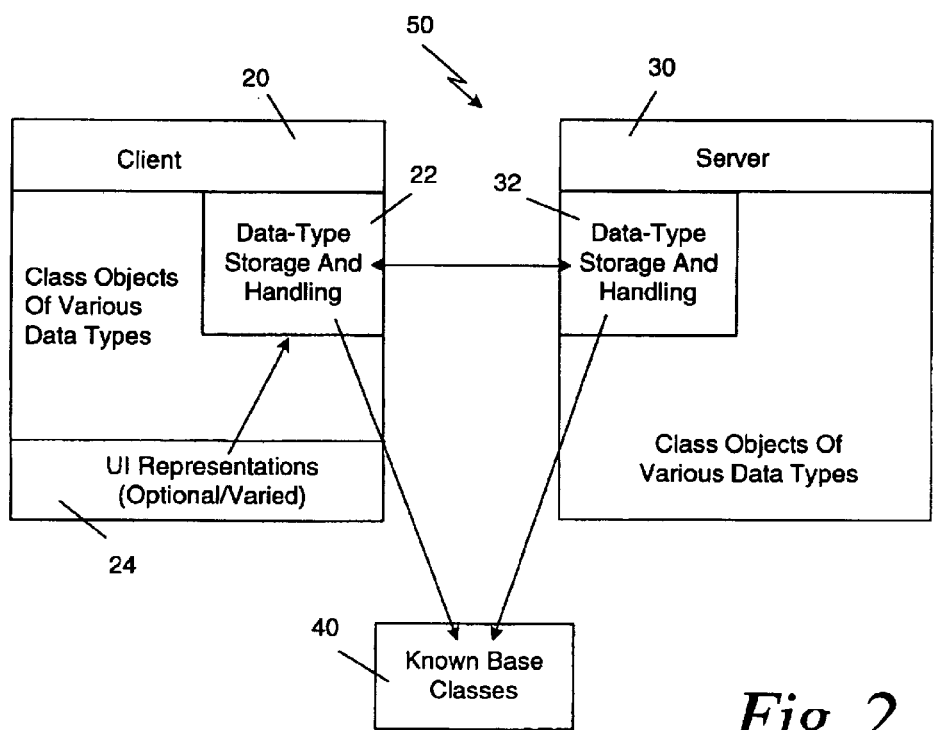
FIG. 2 shows a block diagram of the system having a set of common base classes.

FIG. 2 shows an interconnected system 50 having a client 20 and a server 30. In this embodiment, both the client 20 and the server 30 have a data-type 10 storage and handling unit 22, 32, respectively. The handling and storage units 22, 32 are also referred to as catalogs that cross-reference type identifiers 14 with their respective base classes 12 and data-types 10. Both the client 20 and the server 30 store class objects of various data-types 10 available to the client 20 or to the server 30, respectively. The client 20 and the server 30 share a common set 40 of known base classes 12. The client 20 is also shown to have user interface representations 24 of the objects that are exchanged. Based on the version of the client 20, the user interface representations 24 may vary, and in some older versions certain representations of newer objects or properties may not be implemented.

FIG. 2 shows the interaction between a client 20 and a server 30 in the system 50. By way of example, the system 50 may be originally shipped from the factory having the base server 30 and the base client 20. In use, software objects are serialized and sent between the client 20 and server 30. In this context, the client 20 and server 30 need to know how to reconstitute the software objects. This is done using known definitions of software objects. In their original versions, both the server 30 and the client 20 will know the original set of base classes 40, and both will have a set of data-types 10 in catalogs based upon what the server 30 and the client 20 know about the base classes 40. The set of data-types 10 will correspond to the base classes 12. After a period of time, a newer version of the hardware or the software is used in the system 50. Some users of the system may determine that additional features are useful and have added these features to newer versions clients 20 or servers 30, thereby creating a versioning problem.

Figure 3:
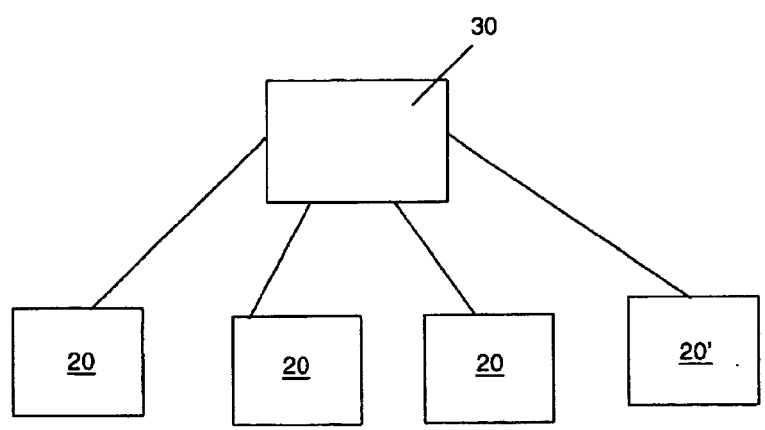
FIG. 3 shows a block diagram of the system having a server and multiple clients.

FIG. 3 shows a system having the server 30 and multiple clients 20. A client 20' may be a newer version of the client 20 and may have new data-types 10 (see FIG. 2) defined to perform new functions. In use, the new client 20' may send a new data-type 10 to an older version of the client 20 through the server 30. The new data-type 10 has certain known properties that are part of the base class 12, as well as certain additional properties 16 that are not known by the older versions of the client 20 and the server 30. For example, an older version of the client 20 might receive a new data-type 10 having the base class 12 properties A, B, and C, and having the newly added, additional attributes D and E. The client 20 will recognize the known properties A, B, and C and will process the properties A, B, and C. If, for example, all of the properties are fields that are displayed, then the older client 20 might display fields A, B, and C, and might not display new, undefined fields D and E. An older version of a server 30 might receive a new data-type 10, and would generally have the ability to process the data-type 10, according to its base class 12.

In one example, a software system may be adapted for word processing in a notes program that formats electronic notes, displaying information in a user-friendly manner. Initially, the system may have three data-types 10 set: general notes, issues, and decisions. Each of the data-types 10 may be used to create a different type of note. Each data-type 10 is distinguished by a unique type identifier 14, and each may have different base classes 12, which may share certain properties common to "notes." In this embodiment, the additional properties portion 16 of each data-type 10 may be empty, because these data-types 10 are original and therefore known to all versions fo servers 30 and clients 20. Users of a system may send notes of any of these formats to other users through the server 30, and each server 30 or client 20 device will understand these formats, because they were included in the original base classes.

If, however, the newer client version 20' creates a new type of note, a "proposal type" note for example, then a potential versioning problem arises. When one client 20 creates an object of a known class, such as general notes, the client 20 can send the general note across the server 30 to another client 20, and the recipient client 20 can recognize and process the general note because the recipient client 20 has known class definitions. However, when a newer client version 20' creates a new object, such as the proposal, the recipient client 20 cannot properly process the proposal if the recipient has an older client version 20. If the server 30 is also of an older version, it too may have difficulty processing the proposal type in existing systems. An older version of a server 30 may refuse to deliver the unknown proposal type to another client.

The system allows older versions to extract as much recognizable data from the unknown objects and prevents the newer version from refusing to accept the unknown object. By providing an additional properties portion 16 of data-types 10, the new proposal object can be defined in terms of a known base class 12. In the example of the proposal data-type 10, this data-type 10 might have a known base class 12 having the same general properties as one of the other notes data-types 10. The new attributes that distinguish the proposal type from other data-types 10 of the notes class would be located in the additional properties portion 16 of the data-type 10. The type identifier 14 would instruct recipient clients 20 of the base class 12 characteristics of this new data-type 10. Using the type identifier 14 in conjunction with a catalog of known base types 12, the older client 20 or server 30 can recognize certain common properties or fields present in the new object. The recipient client 20 may be designed to process the new data-type 10 to the extent that it recognizes the fields or properties of the base class 10. A server 30 may be designed to process the new data-type 10 as any other notes data-type 10.

In another embodiment, similar data-types 10 might be initially designed having certain generic base classes 12, along with additional attributes 16. New data-types 10 added in later versions would have the option of not only adding additional information to existing base classes 12, but could also take away original additional properties 16 to the extent that the new data-type 10 does not use them. In the example above, these three data-types 10 might all have the same base class 12 pertaining to notes. The additional properties portion 16 of each data-type 10 may define the particular nature of each of the original three types of notes. By including additional properties 16 in the initial data-types 10, the system creates a way for the older versions to recognize certain characteristics of the new object.

Although the present invention has been described in detail with respect to certain embodiments thereof, variations are possible. The present invention may be embodied in other specific forms without departing from the essential spirit or attributes thereof. By way of example, the system has been described particularly with respect to Java programming and to specific illustrations. One skilled in the art will recognize that the system applies to all forms of object-oriented programming and to various implementations. It is desired that the embodiments described herein be considered in all respects as illustrative, not restrictive, and that reference be made to the appended claims for determining the scope of the invention.

What is claimed is:

1. A method of communicating a serialized object in a computer network, comprising:

defining first base-classes, wherein each base-class of said first base-classes includes an additional-properties portion for extensibility of the respective base-class;

defining a second class that inherits from one of said first base-classes, wherein said defining a second class includes defining an additional-property element within said additional-properties portion of said one of said first base-classes, wherein said additional-property element comprises a name-value pair;

instantiating a first object of said second class;

serializing said first object;

communicating said serialized first object between first and second systems within said computer network; and creating a second object on said second system as an instance of said one of said first base-classes, wherein said creating omits processing said additional-property element of said additional-properties portion within said serialized first object.

2. The method of claim 1 wherein a catalog of first base-classes is accessible by said first and second systems.

3. The method of claim 1 wherein said second class is defined on said first system and is not defined on said second system.

4. The method of claim 1 wherein said second class comprises a type identifier.

5. The method of claim 4 wherein said creating a second object comprises:

identifying said one of said first base-classes using said type identifier.

6. A computer system, comprising:

a first system including first base-class definitions, wherein each base-class definition comprises an additional-properties portion for extensibility of the respective base-class definition; and a second system including said first base-class definitions and a second class definition that inherits from one of said first base-class definitions and that comprises an additional-property element within said additional-properties portion, wherein said additional-property element comprises a name-value pair;

wherein said second system communicates serializations of objects instantiated according to said second class definition to said first system and said first system creates objects as instances of said one of said first base-class definitions by omitting processing of said additional-property element of said additional-properties portion within said serializations.

7. The computer system of claim 6 wherein said second class definition is not defined on said first system.

8. The computer system of claim 6 wherein said second class definition comprises a type identifier.

9. The computer system of claim 8 wherein said first system identifies said one of said first base-class definitions by analyzing said type identifier.

10. A method, comprising:

serializing a first object of a first class on a first system, said first class inheriting from a second class that comprises an additional-properties portion, said first class defining an additional-property element within said additional-properties portion, wherein said additional-property comprises a name-value pair;

communicating said serialized first object to a second system that does not comprise a definition of said first class; and creating a second object on said second system using said serialized first object, said second object being an instance of said second class, said creating omitting processing of said addition property element within said serialized first object.

11. The method of claim 10 wherein said first class comprises a type identifier.

12. The method of claim 11 wherein said creating comprises:

identifying said second class using said type identifier.

13. The method of claim 12 wherein said first system is a client system and said second system is a server system.

14. The method of claim 12 further comprising:

accessing a definition of said second class from a class definition catalog.

* * * * *

UNITED STATES PATENT AND TRADEMARK OFFICE
CERTIFICATE OF CORRECTION

PATENT NO. : 6,877,162 B1  
APPLICATION NO. : 09/628919  
DATED : April 5, 2005  
INVENTOR(S) : Jeffrey B. Thompson Page 1 of 1

It is certified that error appears in the above-identified patent and that said Letters Patent is hereby corrected as shown below:

IN THE CLAIMS

Claim 13, Column 6, line 60, delete "claim 12" and insert therefor --claim 10--

Claim 14, Column 6, line 62, delete "claim 12" and insert therefor --claim 10--

Signed and Sealed this

Fifteenth Day of April, 2008

JON W. DUDAS  
*Director of the United States Patent and Trademark Office*